United States Patent
Hobbs et al.

(10) Patent No.: US 10,713,958 B2
(45) Date of Patent: Jul. 14, 2020

(54) AUTOMATED LANDING SOLUTION SYSTEMS AND METHODS

(71) Applicant: BENCHMARK ELECTRONICS, INC., Rochester, MN (US)

(72) Inventors: Ronald Hobbs, Rochester, MN (US); James Luecke, Rochester, MN (US)

(73) Assignee: BENCHMARK ELECTRONICS, INC., Tempe, AZ (US)

( * ) Notice: Subject to any disclaimer, the term of this patent is extended or adjusted under 35 U.S.C. 154(b) by 451 days.

(21) Appl. No.: 15/621,992

(22) Filed: Jun. 13, 2017

(65) Prior Publication Data
US 2018/0357910 A1 Dec. 13, 2018

(51) Int. Cl.
*G08G 5/00* (2006.01)
*G08G 5/02* (2006.01)
(Continued)

(52) U.S. Cl.
CPC ........... *G08G 5/0069* (2013.01); *B64C 27/00* (2013.01); *B64C 39/02* (2013.01); *B64C 39/024* (2013.01); *B64D 45/04* (2013.01); *B64F 1/00* (2013.01); *G01S 1/08* (2013.01); *G01S 3/32* (2013.01); *G01S 5/02* (2013.01); *G05D 1/0676* (2013.01); *G08G 5/02* (2013.01); *B64C 2201/108* (2013.01); *B64C 2201/128* (2013.01); *B64C 2201/14* (2013.01); *B64C 2201/141* (2013.01);
(Continued)

(58) Field of Classification Search
CPC ........ G08G 5/0069; G08G 5/02; B64D 45/04; B64C 39/02; B64C 2201/128; B64C 2201/141; B64C 2201/145
See application file for complete search history.

(56) References Cited

U.S. PATENT DOCUMENTS 9,849,044 B1 * 12/2017 Groden ................. A61G 3/001
10,011,352 B1 * 7/2018 Dahlstrom ............. B05B 12/08
(Continued)

FOREIGN PATENT DOCUMENTS

KR 20130122715 11/2013

OTHER PUBLICATIONS

Vito Dronelli: "3 Best drone landing pads" Jun. 6, 2017 (Jun. 6, 2017) XP055508386, Retrieved from the Internet: URL: http://www.dronesglobe.com/guide/landing-pads/.
(Continued)

*Primary Examiner* — Rodney A Bonnette
(74) *Attorney, Agent, or Firm* — Sheppard, Mullin, Richter & Hampton LLP

(57) ABSTRACT

A UAV landing system can include a landing pad defining a landing area including a target point; a plurality of positioning radio transmitters positioned in a spaced apart relation and equidistant from the target point, each radio transmitter transmitting a ranging signal; and a position determination and aircraft navigation system at the incoming UAV to receive the ranging signals; determine a range to each positioning radio using the received ranging signals; compute a position of the UAV relative to the target point; determine a course for the UAV to a point above the target point of the landing pad; fly the UAV to the point above the target point of the landing pad, and cause the aircraft to descend vertically toward the target point when the UAV reaches the point above the target point.

23 Claims, 8 Drawing Sheets

(51) Int. Cl.
    *B64C 39/02*     (2006.01)
    *B64D 45/04*     (2006.01)
    *B64C 27/00*     (2006.01)
    *G05D 1/06*     (2006.01)
    *G01S 3/32*     (2006.01)
    *B64F 1/00*     (2006.01)
    *G01S 1/08*     (2006.01)
    *G01S 5/02*     (2010.01)

(52) U.S. Cl.
    CPC .... *B64C 2201/145* (2013.01); *B64C 2201/18* (2013.01)

(56) References Cited

U.S. PATENT DOCUMENTS

| | | | |
|---|---|---|---|
| 10,053,236 B1 * | 8/2018 | Buchmueller | G01N 29/4454 |
| 2010/0256841 A1 | 10/2010 | Garrec | |
| 2016/0068264 A1 | 3/2016 | Ganesh | |
| 2016/0207637 A1 | 7/2016 | Campillo | |
| 2018/0053139 A1 * | 2/2018 | Stoman | G06Q 10/083 |
| 2018/0173245 A1 * | 6/2018 | Twining | B64D 45/00 |

OTHER PUBLICATIONS

Extended European Search Report for European Patent Application No. 18177592.5, dated Oct. 8, 2018 (8 pages).
Communication Pursuant to Article 94(3) EPC on European Patent Application No. 18177592.5 dated Feb. 27, 2020.

* cited by examiner

AUTOMATED LANDING SOLUTION SYSTEMS AND METHODS

TECHNICAL FIELD

The disclosed technology relates generally to aircraft navigation and more particularly, some embodiments relate to an autonomous landing solution for unmanned aircraft.

DESCRIPTION OF THE RELATED ART

Unmanned aerial vehicles (UAVs) are growing in popularity and usage. The number of applications for UAVs has risen dramatically in recent years and it is expected to continue to increase. As the applications for UAVs rises so too has the desire for portable UAV landing pads and improved UAV landing solutions. Conventional UAV landing operations are controlled by an operator manually piloting the UAV to a safe landing using visual cues. Other systems use a beacon as a homing device that the UAV can lock on and pilot toward for landing. Such a beacon, however, is no more than a homing device that allow the UAV to determine a direction to the landing pad.

BRIEF SUMMARY OF EMBODIMENTS

According to an embodiment of the disclosed technology A UAV landing system, includes: a landing pad defining a landing area for a UAV, the landing area comprising a target point for UAV landing or payload delivery; a plurality of positioning radios positioned in a spaced apart relation and substantially equidistant from the target point, each positioning radio of the plurality of positioning radios including a radio transmitter wherein each radio transmitter is configured to transmit a ranging signal to an approaching UAV. The UAV can include a position determination and aircraft navigation system, which may include a radio receiver to receive the ranging signals; a positioning circuit, communicatively coupled to the radio receiver, that determines a range to each positioning radio using the received ranging signals, and computes a position of the UAV relative to the target point on the landing pad; and a flight control system that determines a course for the UAV to a point above the target point of the landing pad, flies the UAV to the point above the target point of the landing pad, and causes the aircraft to descend vertically toward the target point when the UAV reaches the point above the target point. The ranging signals may include timing information and the positioning circuit determines the range to each positioning radio using a time of flight of each respective ranging signal determined by the timing information. At least one of the positioning radios can further transmit identification information identifying the landing pad.

The positioning circuit can be implemented to compute the position of the UAV relative to the target point of the landing pad as a range and altitude relative to the landing pad, wherein the target point may be at the center of the landing pad. The flight control system can be implemented to further determine when the UAV is directly above the target point. In some embodiments, the landing pad is rectangular in geometry, the target point is the center of the landing pad, and the plurality of positioning radios may include four positioning radios, one disposed at each corner of the landing pad. In another embodiment, the landing pad is round in geometry, the target point is the center of the landing pad, and the plurality of positioning radios may include four positioning radios disposed at 90-degree intervals around the target point. The positioning radios may, for example, be around the outer edge of the landing pad or at intervals on a constant radius around the target point. In yet another embodiment, the target point is the center of the landing pad, and the plurality of positioning radios may include positioning radios disposed at each corner of the landing pad.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for providing an automated landing solution for aircraft. More particularly, some embodiments of the technology disclosed herein relate to an automated landing solution for unmanned aerial vehicles (UAV). According to various embodiments, a unique configuration of ranging and control systems are provided and may be configured to allow a UAV to determine the location of and range to a landing pad, and to compute a landing solution to allow the UAV to control landing itself on the pad. In some embodiments, a plurality of ranging radios are disposed at predetermined positions on the landing pad. These radios broadcast signals that can be detected by a receiver on the UAV and used by control circuitry on the UAV to compute the UAV's vertical and horizontal distances from the pad, and the UAV's angle of flight relative to the pad. From this information, the UAV computes a flight path to close the horizontal distance to the center of the pad. When the horizontal distance reaches zero (i.e., the UAV is centered over the pad), the UAV decreases its altitude to descend vertically toward the center of the pad. For landing operations, the UAV can use these techniques to locate, close on, and control its landing on the landing pad. For payload pickup and delivery operations, the UAV can use these techniques to locate, close on, and control its descent over the pad for drop off and pick up.

Figure 1:
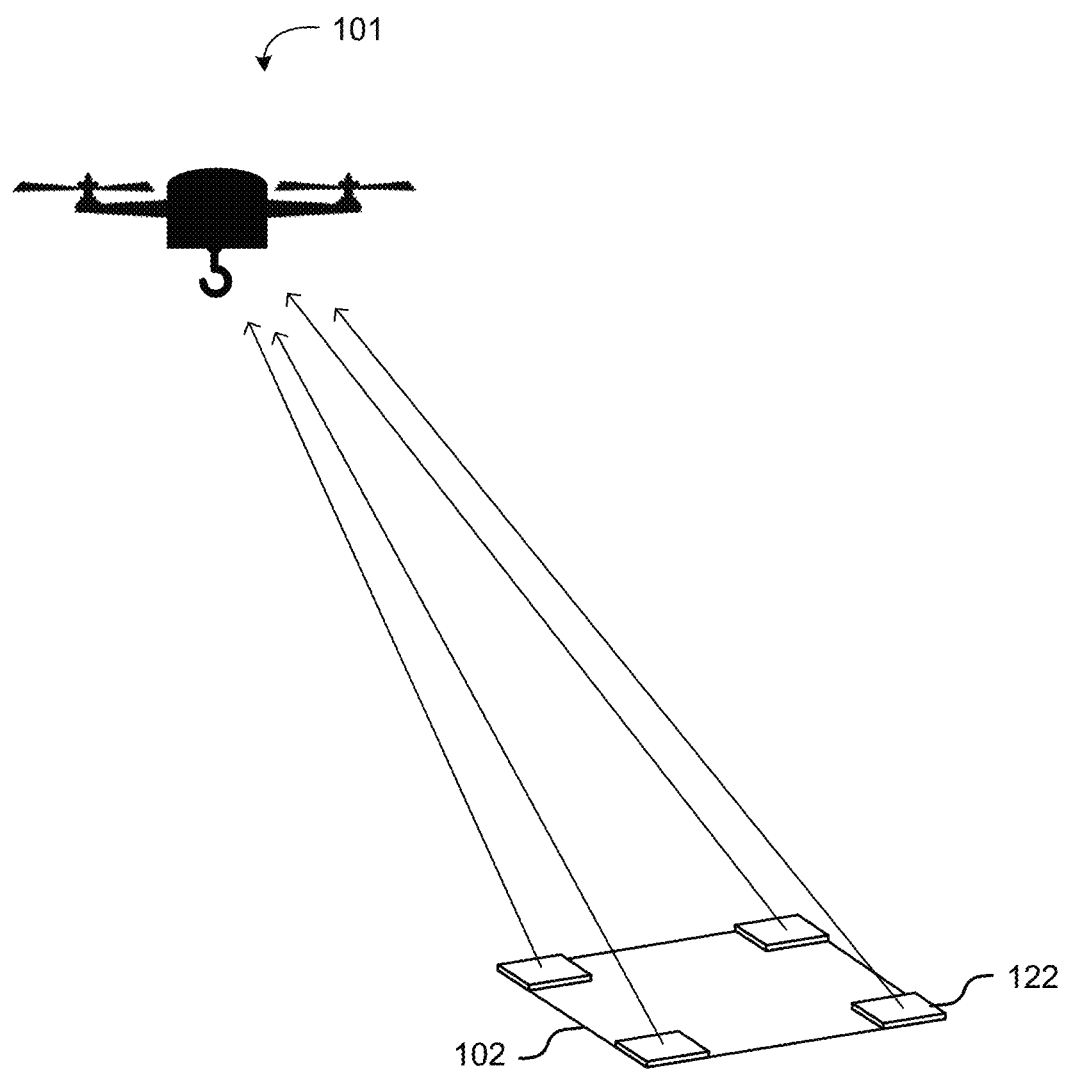
FIG. 1 illustrates one example of a system to implement an automated landing solution in accordance with one embodiment of the systems and methods described herein.

FIG. 1 illustrates one example of a system to implement an automated landing solution in accordance with one embodiment of the systems and methods described herein. In this example, a UAV 101 is depicted as navigating toward a designated landing pad 102. Also in this example, designated landing pad 102 includes a plurality of positioning radios 122. In this example, there are four positioning radios 122 disposed one each at each corner of the landing pad 102. As discussed in further detail below, four positioning radios 122 are provided to transmit positioning information to allow UAV 101 to locate its position relative to a target point of the landing pad. Four positioning radios 122 allows UAV 101 to locate and land on a target point of landing pad 102 without additional navigational aids. In other embodiments, a different quantity of positioning radios 122 can be provided. In some embodiments, the target point is the center of the pad or the center of a designated landing area of the landing pad. In other embodiments, the target point can be chosen as somewhere other than the center of the pad or the center of a designated landing area. For example, the target point can be defined as offset from the center of the landing pad or landing area. In yet further embodiments, the target point can be defined as a point on a package to be picked up.

Figure 2:
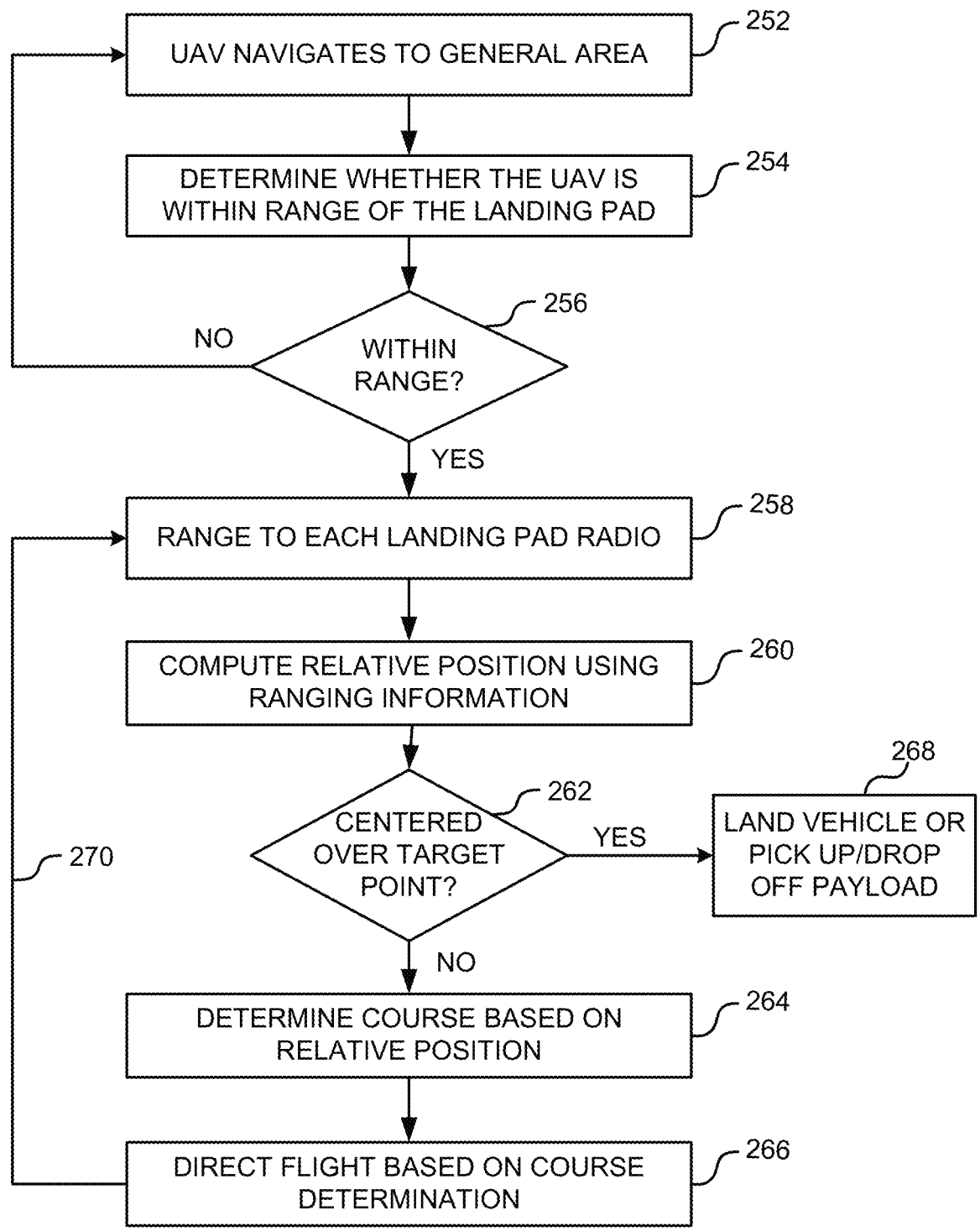
FIG. 2 illustrates an example process for computing a UAV landing solution in accordance with one embodiment.

FIG. 2 illustrates an example process for computing a UAV landing solution in accordance with one embodiment. With reference now to FIG. 2, at operation 252 the vehicle (e.g., a UAV such as UAV 101) flies to the general area at which the landing pad (e.g. landing pad 102) is located. In various embodiments, UAV 101 may be configured to navigate to the general location of landing pad 102 independently (i.e., without the use of positioning radios 122). For example, the predetermined location of the landing pad can be defined by coordinates in latitude and longitude, a street address, a sector in a grid, or other information used to generally identify the area at which the landing pad is located. Any of a number of techniques can be used to navigate the aircraft independently to the general area of the landing pad 102. For example, GPS, LORAN, beacons, other aids to navigation (ATON), dead reckoning, or other navigational systems or techniques can be used to navigate and fly the vehicle to the general area of the desired landing pad 102. As another example, a pilot can be employed to fly the UAV to the general area of the desired landing pad 102 manually, such as via a remote control system.

At operations 254 and 256, the UAV determines whether it is within range of the positioning radios 122 at the desired landing pad 102. In some embodiments, this is done based on the raw positioning data of the UAV alone. In other embodiments, the UAV determines that it is within range of the desired landing pad 102 when it detects signals from the positioning radios 122 at the desired landing pad 102. In some embodiments, one or more of the positioning radios 122 can include identification information encoded into the ranging signal(s) such that the aircraft can determine an identification of the pad 102 to confirm that it is approaching the correct landing pad. For example, a designated portion or frame of the information embedded in the ranging signals can include this identification information. The identification information can uniquely identify the landing pad so that the aircraft can confirm that it is approaching the correct pad. In further embodiments, the identification information may be sufficient to allow the aircraft to resolve the identity of each of the positioning radios. As one example, the identification information included in the ranging signals can include two parts: one part that identifies the landing pad, and a second part that uniquely identifies each of the positioning radios at that landing pad.

Once the UAV is within range of the positioning radios 122 (decision block 256), the UAV ranges to each positioning radio 122 to determine its position relative to the desired landing pad 102. This is illustrated by operation 258. In some embodiments, a receiver within the UAV receives signals from each positioning radio 122 and a controller within the UAV determines a distance of the aircraft to each radio individually. In some embodiments, the system can be configured such that the UAV moves to the general area of the landing pad 102 and then announces its presence by attempting to range to the radios or by sending a signal to the landing pad 102. The announcement of the presence of the aircraft in the vicinity of the landing pad 102 can be used to "wake up" circuitry of the landing pad (e.g., positioning radios 122) from a sleep mode. This approach can keep the landing pad 102 from broadcasting signals when not necessary. In other embodiments, positioning radios 122 can be designed to constantly or periodically transmit their signals such that when the signal is received by an aircraft in the vicinity, the aircraft can wake up its position determination and aircraft navigation system for ranging operations. In either case the UAV may decode identification information in bedded in the positioning radio signals to ensure that it is approaching and landing on the correct pad.

The measured distances between the UAV and each positioning radio on the pad are used to determine the location of the UAV relative to the pad. This is illustrated at operation 260. Consider an example where the target point is at the center of the pad, the UAV uses a distance measurement computed from each radio signal to determine a relative position (e.g. in altitude and range) of the aircraft from the center of the pad or from another defined target point of the landing pad. Multiple measurements during flight can be used to also determine the direction of travel relative to the target point, which can be reflected, for example, by a flight-path angle.

Based on this measurement, at operation 262, the UAV determines its position relative to the target point of the landing pad. For example, the UAV determines whether it is centered over the target point of the desired landing pad 102 or whether its position is a horizontal distance from the center. For example, where four positioning radios 122 are provided on landing pad 102, the UAV is centered over the pad when the distance measurements to all four positioning radios 122 are the same. If the UAV is not centered over the desired landing pad 102, it determines its course to the landing pad center based on the relative position determination as indicated at operation 264. At operation 266, the UAV directs its course toward the center of the desired landing pad 102 based on the course determination.

Throughout the flight, the UAV continues to make ranging measurements based on data from positioning radios 122, compute its position relative to the pad and direct its course toward the pad based on those measurements. This may be continued until the UAV is centered over the pad. This is illustrated by flow line 270. When the UAV determines that it is centered over the desired landing pad 120 (operation 262), at operation 268 the UAV descends toward the center of the pad to land or to pick up or drop off its payload. In the illustrated example, when the UAV determines that its distance to each of the plurality of positioning radios 122 is equal, the UAV can determine that it is centered over the pad.

Although not illustrated, during descent the UAV can continue to monitor ranging data from the positioning radios 122 to determine whether it remains centered over the pad (e.g., whether the distance to each radio is substantially equal, albeit decreasing due to the descent) and to make horizontal positioning adjustments if necessary. This can be useful, for example, where wind conditions could affect the horizontal position during descent. As another example, this can also be useful in applications such as where the aircraft is attempting to engage a landing pad that is positioned on a moving vehicle and must continue ranging to track vehicle movements during descent to the pad.

As the above example illustrates, in various embodiments the UAV can be configured to compute a landing solution that maintains a predetermined altitude (or a predetermined minimum altitude) while closing the range between the UAV and the center of the landing pad. Then, only when the UAV is above the target point of the pad, does it begin its descent from the predetermined altitude down to the pad. In this manner, the UAV can avoid obstacles such as trees, buildings, towers, antennas, or other obstacles that may be in the vicinity of the pad. In some circumstances, this can be advantageous over conventional solutions such as a beacon or homing source that might guide the UAV more directly to the pad rather than closing the range before beginning the descent. Additionally, because the positioning radios can be used to determine navigation information, this system can be advantageous in dynamic environments in which the line-of-sight path is changing, such as on a moving vehicle, for example.

Because this example landing solution allows a vertical descent from a determined minimum altitude, assuming the space above the landing pad is clear, the UAV can descend to the pad without the need for additional object detection aids such as a camera, radar, lidar, infrared sensors, etc. to avoid obstacles in the vicinity of the pad. It is noted that conventional solutions that use beacons only guide the UAV to the pad, and do not provide position or location information, such as, for example, three-dimensional location information, for the aircraft. Accordingly, the homing information provided by the beacon can guide the UAV to the target, but it cannot tell the UAV what its absolute position is. Importantly, it cannot tell the UAV what its position is relative to the landing pad.

Figure 3:
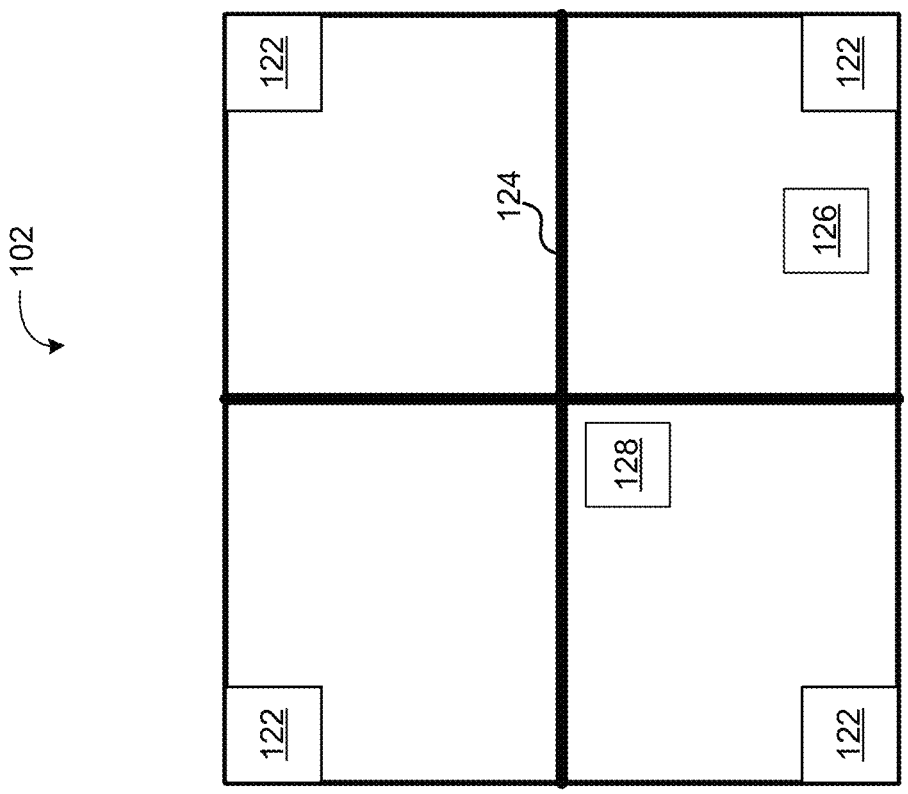
FIG. 3 illustrates another embodiment of an example landing pad in accordance with one embodiment.

Landing pad 102 can include technology in addition to positioning radios 122 to add enhanced features to landing pad operations, including payload pickup and delivery operations. FIG. 3 illustrates another embodiment of an example landing pad 102. This example illustrates four positioning radios 122 disposed one each at each corner of the landing pad. The positioning radios 122 can be disposed on the landing pad at points equally spaced around, and equidistant from the target point so that during ranging operations, the aircraft can use a positioning information to determine its position relative to the target point of the landing pad. The degree of precision required for placement of the positioning radios can vary depending on the positioning accuracy desired for the landing solution. Because manufacturing tolerances and production conditions can vary, the placement of the positioning radios at positions that are substantially equidistant from the target point and substantially equally spaced around the target point is sufficiently precise when the amount of error in measurement resulting from any placement error still allows aircraft relative position to be computed with sufficient accuracy for the given application.

Although four positioning radios 122 are shown in this example, other quantities of positioning radios can be provided on the pad. For example, additional positioning radios 122 can be provided for redundancy. As another example, embodiments can be implemented with three positioning radios 122. Positioning radios 122 can be integrated into the landing pad structure or disposed above the top surface of the landing pad 102. Additional detail regarding example embodiments of positioning radios 122 is discussed in detail below. In further embodiments, instead of or in addition to including positioning radios 122 at the landing pad, positioning radios can be included on the payload item to be picked up from the pad. For example, positioning radios can be positioned at four corners of the package to be picked up so that the aircraft can locate the center of the top surface of the package by arranging the positioning radios on the package. If the payload attachment mechanism (e.g., hook, magnet, clip, coupling, or other device used to attach the payload to the aircraft) is centered within the positioning radios on the package, the aircraft can locate and navigate to the attachment mechanism in the similar manner as described herein for locating and navigating to a target point on the landing pad. This can be useful, for example, in applications where a pad is not equipped with positioning radios or even in circumstances where there is no landing pad.

The example landing pad 102 illustrated in FIG. 3 includes crossed-lines 124 with the intersection of such lines positioned at the center of the landing pad 102. With such embodiments, the aircraft (e.g., UAV 101) can use an optical sensor such as a camera or other image sensor to detect the pad and identify its center when it is within visual range of the pad. This can be used to supplement information obtained from the positioning radios or can be used as a backup methodology. Crossed-lines 124 can also be useful to allow a user to center the payload on the pad for pickup.

Also illustrated in the example of FIG. 3 is a pad identifier 126. Pad identifier 126 can be included to provide a unique identification of the pad to approaching aircraft. Pad identifier 126 can be implemented using electronic or optical techniques to identify the pad. Pad identifier 126 can be implemented, for example, as a barcode label, a QR code label, an RFID tag, a RuBee tag (IEEE standard 1902.1), an iButton tag, or other like identifier that can be read by an approaching aircraft.

The landing pad illustrated in this example also includes identification circuitry 128 to identify a package or other payload that is placed on or in the vicinity of the pad. For example, this identification circuitry can use a barcode or QR code reader, an RFID or RuBee tag reader, an iButton tag reader or other like detection circuitry that can read and identification of an item on the pad. Identification circuitry 128 can be coupled to a communications interface of the landing pad such that identification of a package or other item deposited on the pad can be communicated to a user via the communications interface.

Landing pad 102 can be configured as a stationary pad. In other embodiments, landing pad 102 can be configured as a portable landing pad that can be picked up, moved, and positioned at various locations, and it can be put away for storage when not in use. Landing pad 102 can be configured for placement on a variety of fixed or mobile platform such as, for example, on a rooftop, on a porch or patio, in a lawn or field, in a driveway, on a moving or stationary vehicle, in a parking lot, and so on. In some embodiments, landing pad 102 can be made of a flexible or foldable material so that it can be folded or rolled up for transportation and storage.

Landing pad 102 illustrated in this and other examples herein is configured in a rectangular shape (which can include a square shape), however, the landing pad can be of a shape other than a rectangular shape in various embodiments. For example, in some embodiments the landing pad can be of a shape chosen from, for example, the shapes: round, oval, parallelogram, pentagon, hexagon, heptagon, octagon, nonagon, decagon, diamond, irregular shape, and other shapes.

Figure 4:
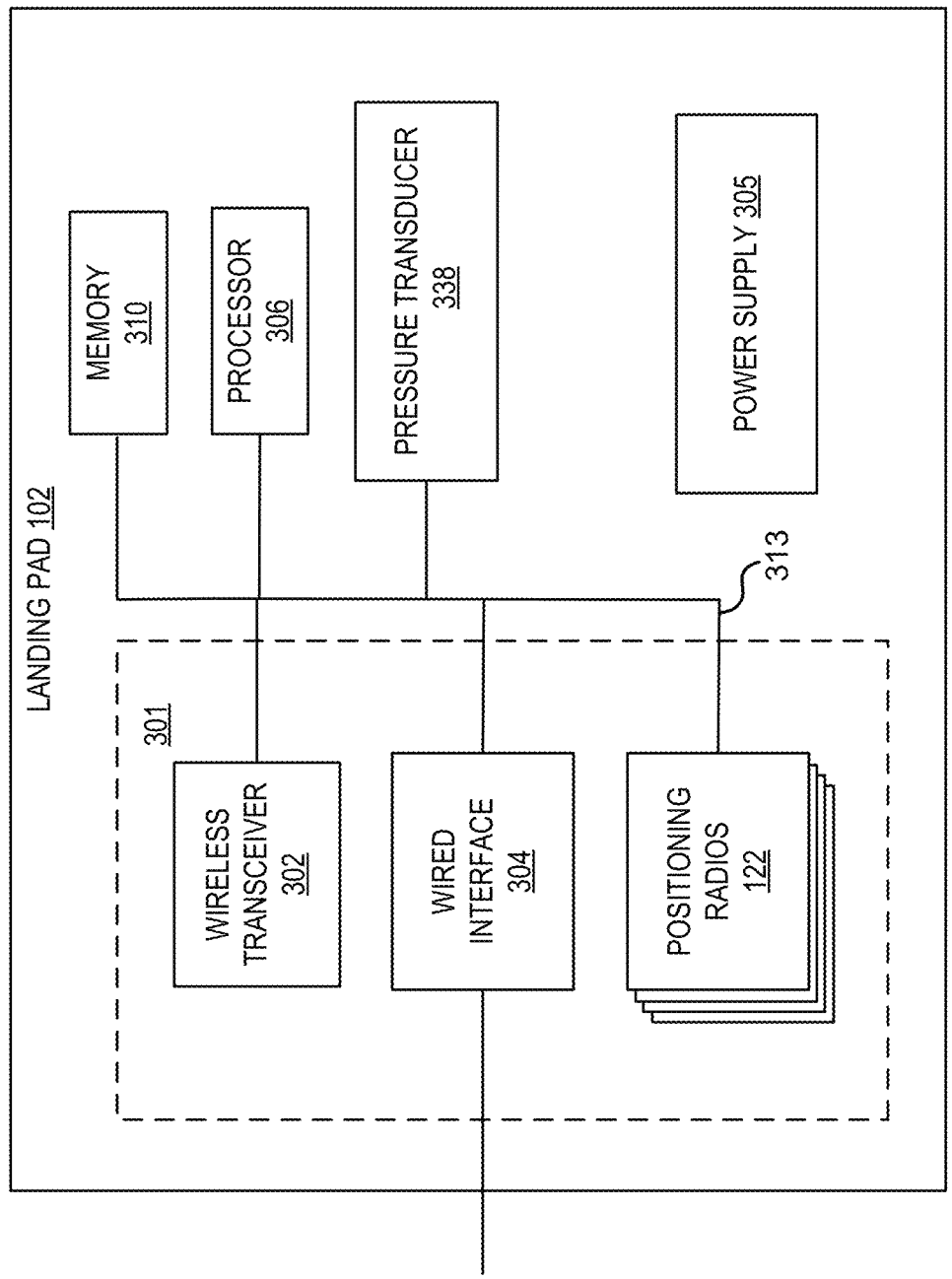
FIG. 4 illustrates an example configuration of a landing pad in accordance with one embodiment of the systems and methods disclosed herein.

FIG. 4 illustrates an example configuration of a landing pad 102 in accordance with one embodiment of the systems and methods disclosed herein. With reference now to FIG. 4, this example landing pad 102 includes communications interfaces 301, processor 306 and memory 310, the pressure transducer 338, a control module 336, and a power supply 305. In this example, communications interfaces 301 include a wireless transceiver 302, a wired interface 304, and a plurality of positioning radios 122. These components can be interconnected via a communications interconnection 313 such as one or more buses, printed circuit board interconnects, or other communications interconnects.

In various embodiments, a wireless communications interface 301 can be included to allow landing pad 102 to communicate with other devices such as, for example, via a local area network. Accordingly, the wireless transceiver 302 can be included to provide this communications interface. This communications interface can be implemented, for example, according to a number of different wireless protocols, including standardized protocols. Examples of such standardized protocols include Bluetooth®, HiperLan, and various IEEE 802.11 communications standards, although other communication interfaces (whether or not standardized) can be implemented. Accordingly, wireless transceiver 302 can be configured to communicate directly with other user equipment or to communicate with such equipment through a wireless network. Wireless transceiver 302 can be used to provide information to the user or other personnel such as identification of the landing pad 102 with which it is associated, the presence or absence of a package on the pad (e.g., as determined by pressure transducer 338) and other information. Likewise, wireless transceiver 302 can receive information from the user or other personnel such as, for example, instructions regarding when and for how long to activate positioning radios 122, updated identification information for the pad, software updates for the pad, and so on.

A wired interface 304 can be included to allow hardwired communications with the user or other personnel. This can be implemented, for example, as a USB interface to allow the device to communicate with other USB-capable devices via the standardized USB interface. A USB interface transfers signal and power over a four-wire cable with endpoint connections defined by the USB standard (e.g., the USB 3.1 standard). Although not illustrated in FIG. 4, if implemented as a USB device, wired interface 304 may also include a standardized USB connector that can be used to connect the landing pad to other USB devices using standardized USB cabling. Power can also be provided to the landing pad via a USB interface to power the landing pad 102 or to charge its power supply 305. As another example, wired interface 304 can be implemented as a hardwired network interface such as, an Ethernet network interface. As yet another example, wired interface 304 can be implemented as a nonstandardized hardwired interface.

Positioning radios 122 are included and in the illustrated example are part of communications interface is 301 (although they could be included separately). Positioning radios 122 can be implemented as wireless transmitters to transmit ranging information (e.g. time codes or other data sequences) to the aircraft. The aircraft can use signal parameters from each positioning radio 122 to determine its distance from that radio. These parameters can include, for example, received signal strength, time of arrival, and time difference of arrival. Positioning radios 122 can be implemented as radio transmitters to transmit ranging signals (e.g., timing information) to the UAV. In other embodiments, positioning radios 122 can be implemented as transceivers for two-way communication. In some embodiments, positioning radios 122 utilize communication protocols suitable for ranging operations. For example, positioning radios 122 can be configured to use the IEEE 802.15.4a standard for impulse radio ultra-wide-band (IR-UWB) signals. In such implementations, one of three different IEEE 802.15.4a ranging protocols can be used. These are two-way time of arrival (TW-TOA), symmetric double sided (SDS) TW-TOA (which is more precise), or private ranging, which can be used for sensitive operations.

Memory 310, can be made up of one or more modules of one or more different types of memory, and in the illustrated example is configured to store data and other information as well as operational instructions that may be used by the processor 306 to operate landing pad 102. The processor 306, which can be implemented as one or more cores, CPUs, or other processor units, for example, may be configured to execute instructions or routines and to use the data and information in memory 310 in conjunction with the instructions to control the operation of the landing pad 102. Although the example of illustrated in FIG. 4 is a processor-based landing pad, as another example landing pad features can also be implemented using one or more ASICs, PLAs or other circuitry. As a further example, the landing pad can be implemented without any circuitry other than the positioning radios and a power source for the positioning radios.

The illustrated example also includes a pressure transducer 338. Pressure transducer 338 can be included to allow the landing pad to detect the presence of a payload on the pad and also to detect the weight of the payload on the pad. For example, for package pickup and delivery, landing pad 102 can use pressure transducer 338 to detect the presence of a package positioned on the pad for pickup. This information can be sent to the package delivery system with additional information such as, for example, identification of the pad, the pad location, the weight of the package, package identification information, and so on. Package identification information can be determined, for example, based on user input. In some embodiments, landing pad 102 can include an RFID reader, optical scanner, or other near field communication device to detect the presence of the package and to receive package identification information.

Pressure transducer can also be used to detect delivery of a package to the pad by an aircraft. For example, when an aircraft arrives at and deposits its payload on landing pad 102, pressure transducer 338 can detect the added weight of the package and determine that a package has been delivered. In response, landing pad 102 can communicate to a user that the package has been delivered. This communication can be, for example, through wireless transceiver 302 or wired interface 304. As noted above, landing pad 102 can be configured to identify the package delivered using, for example, an RFID reader, optical scanner, or near field communication device to detect the presence of the package and to receive package identification information. Package identification can be included in the transmission to the user so the user knows what packages delivered. Landing pad 102 can also be configured to confirm that the correct package was delivered based on the identification of the package. In some embodiments, landing pad 102 can compare the weight of the package delivered as sensed by pressure transducer 338 with known shipping weight of the parcel as a check to determine whether the correct package was delivered. Accordingly, the landing pad can act as a package delivery indicator or indicator that package is ready to be shipped.

Power supply 305 can also be included to power the various components of landing pad 102. Power supply 305 can be implemented as a rechargeable battery, capacitor bank or other energy storage device. In some embodiments, power supply 305 is configured to be charged, for example, via wired interface 304, by a wireless inductive charging system, through an array of photovoltaic cells included with landing pad 102, or other charging systems.

To conserve power during periods of non-operation, the components of the landing pad 102 can be in a sleep mode until a wake event occurs to power up the system. For example, the placement of a package for delivery on the pad by a user can cause one or more components to wake up and begin operations. As a further example, placement of a package on the pad for delivery can cause the wireless communications transceiver to wake up to allow the pad to communicate to a package delivery network (e.g., the shipper) that the package is ready to be picked up. Placement of a package on the pad for delivery can also cause identification circuitry to read the package identification so that this identification information can be included to identify the package that is ready to be picked up. As another example, delivery of a package to the pad by an aircraft and cause the communications transceiver to wake up so that the recipient can be alerted that the package has been received. Likewise, this information can be sent over a communication network to inform the shipper that the package has been delivered.

As a further example, positioning radios 122 can be configured to wake up periodically to check for the presence of an aircraft. When an aircraft is detected, positioning radios 122 can join the aircraft's wireless network and begin communicating. In some embodiments, the positioning radios on landing pad 102 and the corresponding radio in the aircraft form a mesh network. In other embodiments, one radio, such as the radio in the aircraft, serves as a master node for the network.

The circuitry and components of landing pad 102 such as those described herein can be embedded within landing pad 102 to protect these components from weather and other elements. In some embodiments, components can be mounted on a flexible circuit board to allow landing pad 102 to be made of a soft or flexible material that can be rolled up to store and transport landing pad 102.

Figure 5:
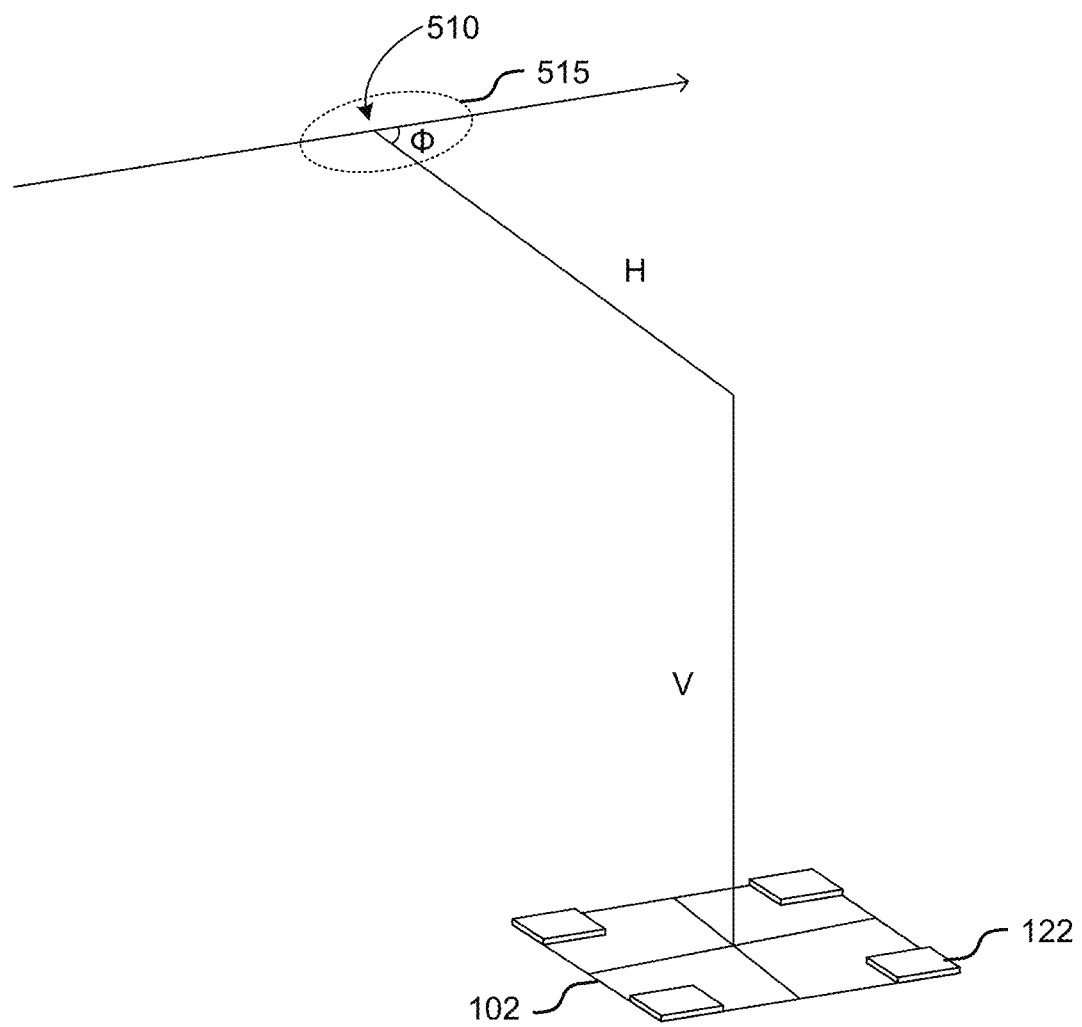
FIG. 5 illustrates an example of aircraft position of the UAV relative to a target point of the landing pad in accordance with one embodiment.

As noted above, in some embodiments the landing solution allows the aircraft (e.g. UAV 101) to determine its position relative to the target point of the landing pad. FIG. 5 illustrates an example of relative position from a target point of a landing pad 102 in accordance with one embodiment. In this example, assume that the aircraft is at location 501 in plane 515 as determined by its most recent ranging operation. Based on the ranging information it received from the positioning radios, the aircraft is able to determine its elevation, or vertical displacement, V, above the plane of the landing pad 102, and its horizontal distance, or range, H, from the center of the landing pad 102. And, with more than one measurement, it is able to determine its flight angle, $\phi$, relative to the direction to the center of the pad.

Embodiments allow the UAV to determine its location relative to the target point by measuring distances to multiple positioning radios 122 using geometry. Ranging protocols, such as those based on time of arrival, can be used to compute the range between the aircraft and the positioning radios 122. In various embodiments, the ranging signal sent from positioning radios 122 to the UAV include timing information. This timing information can include, for example, information indicating the time of transmission of the signal. To compute the range to a positioning radio 122, the departure time and the arrival time of the signal are used to determine the time of flight of the signal from the positioning radio 122 to the UAV. The time-of-flight is multiplied by the speed of the transmission (e.g., the speed of light) to determine the distance. As noted above, the distances to multiple positioning radios 122 (e.g. four radios as shown in FIG. 1 and FIG. 3) are computed.

Based on the distances to the multiple positioning radios 122, the UAV can determine its position relative to the pad. In some embodiments, the UAV is configured to use multilateration to determine its position relative to the center of the pad. Multilateration allows the receiver on the aircraft to locate itself by measuring signals emitted from three or more transmitters at known locations. In this case, the locations of the transmitters relative to the center of the pad are known. In other embodiments, the UAV is configured to use trilateration to determine its position relative to the center of the pad.

Figure 6:
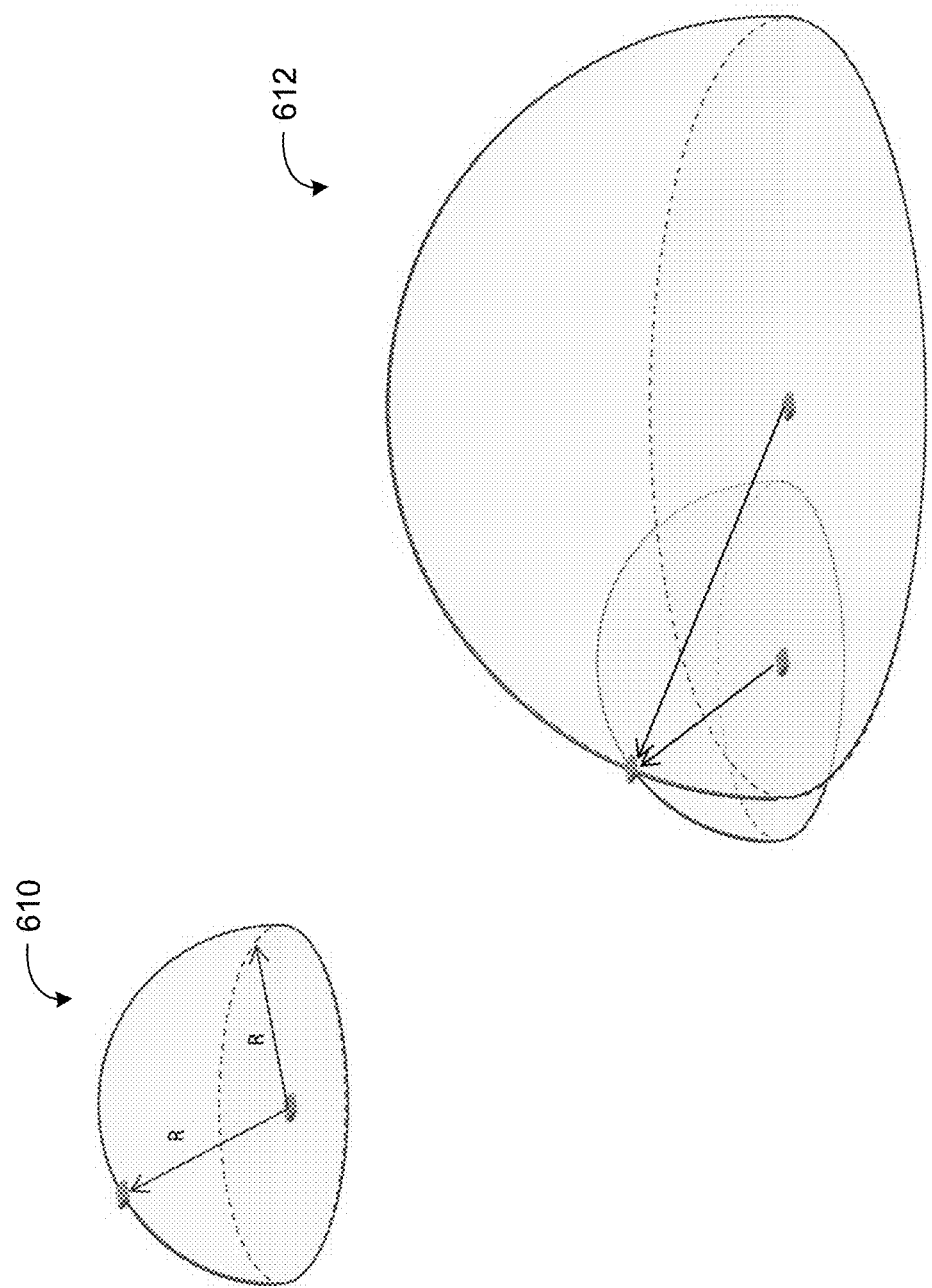
FIG. 6 illustrates examples of trilateration.

FIG. 6 illustrates examples of trilateration. As illustrated in FIG. 6 at 610 a ranging measurement to a single positioning radio 122 allows the UAV to determine that it is placed somewhere on the surface of a half sphere surrounding positioning radio 122 at a distance, R, from the positioning radio 122. The radius of the sphere, R, is the calculated distance from the UAV to the radio. However, because the UAV in this circumstance only knows its distance to a single radio, it cannot determine from that information alone where on that sphere it is actually located. Accordingly, measurements to multiple positioning radios 122 at different locations are made. In the example implementation having four positioning radios 122, the UAV can compute four spheres by ranging to each of the four positioning radios 122. The intersection of these four spheres determines the location of the UAV as shown at 612 (only two transmitters shown for clarity of illustration). This technique can allow the aircraft to determine its vertical distance, horizontal distance, and angle to landing pad 102. When the aircraft moves to where the horizontal distance is zero (e.g. the range to each of the positioning radios 122 is the same), then a vertical descent can be initiated to land the UAV on the pad, assuming no other external forces are present (e.g., wind, placement of the pad on a moving vehicle, etc.)

As described above given the signals for multiple positioning radios 122, UAV can determine its location and based on that location calculate a landing solution to travel to the center of the desired landing pad 102. In some embodiments, all calculations to determine position and the landing solution are computed on-board the UAV using ranging information determined by signals from the positioning radios 122. In other embodiments, some or all of this information can be sent back to a control center that is controlling the UAV, and the control center can make some or all of these calculations. In yet other embodiments, some or all of this information can be sent back to the landing pad, and the landing pad can be used to make these determinations.

Figure 7:
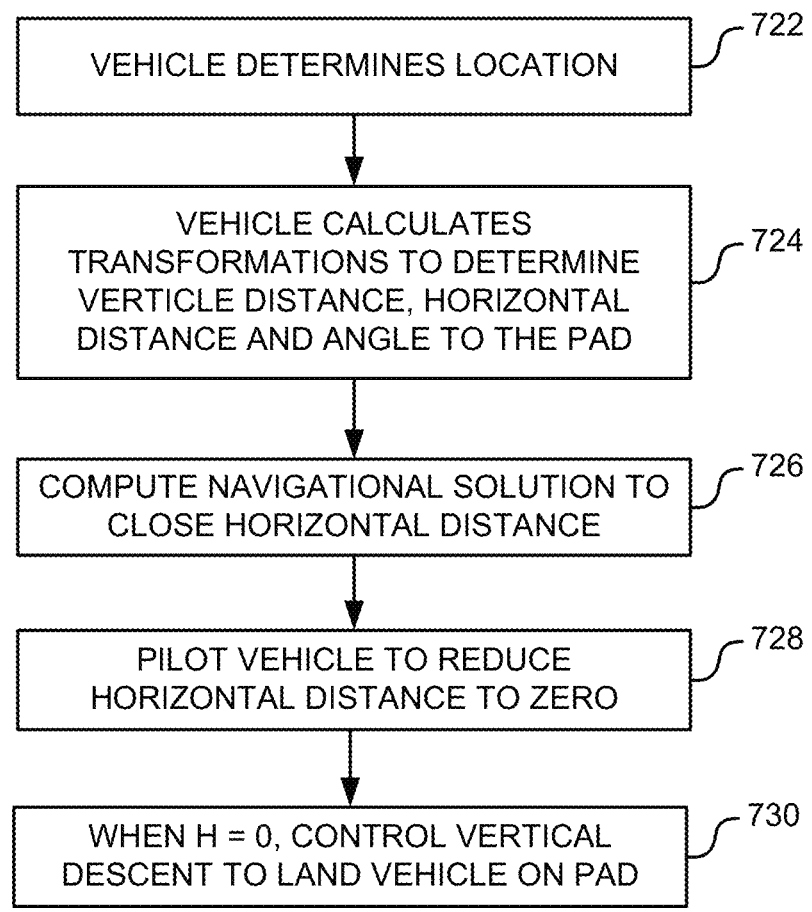
FIG. 7 is an operational flow diagram illustrating an example process for calculating a landing solution in accordance with one embodiment.

FIG. 7 is an operational flow diagram illustrating an example process for calculating a landing solution in accordance with one embodiment. The example illustrated in FIG. 7 assumes that the UAV is making the landing solution calculations. In other embodiments, some or all of these calculations can be made by one or more other components in the system as noted above. With reference now to FIG. 7 at operation 722, the aircraft determines its location. For example, as described above, a UAV can determine its range to multiple positioning radios (e.g. positioning radios 122). Then, at operation 724, the aircraft performs calculations used to determine its position relative to the center of the pad. As noted above, in one embodiment, the aircraft determines its position as its altitude or vertical distance above the pad, V, range or horizontal distance from the center of the pad, H, and its angle of attack, φ.

Knowing its position and current angle, the aircraft can compute a navigational solution to close the horizontal distance to the center of landing pad 102. This is illustrated at operation 726. At operation 728, the aircraft uses this information to adjust its heading, if necessary, and close the distance between itself and the center of the pad to reduce that distance to zero. Once the aircraft is over the center of the pad, at operation 730, it controls its vertical descent to land on the pad.

Figure 8:
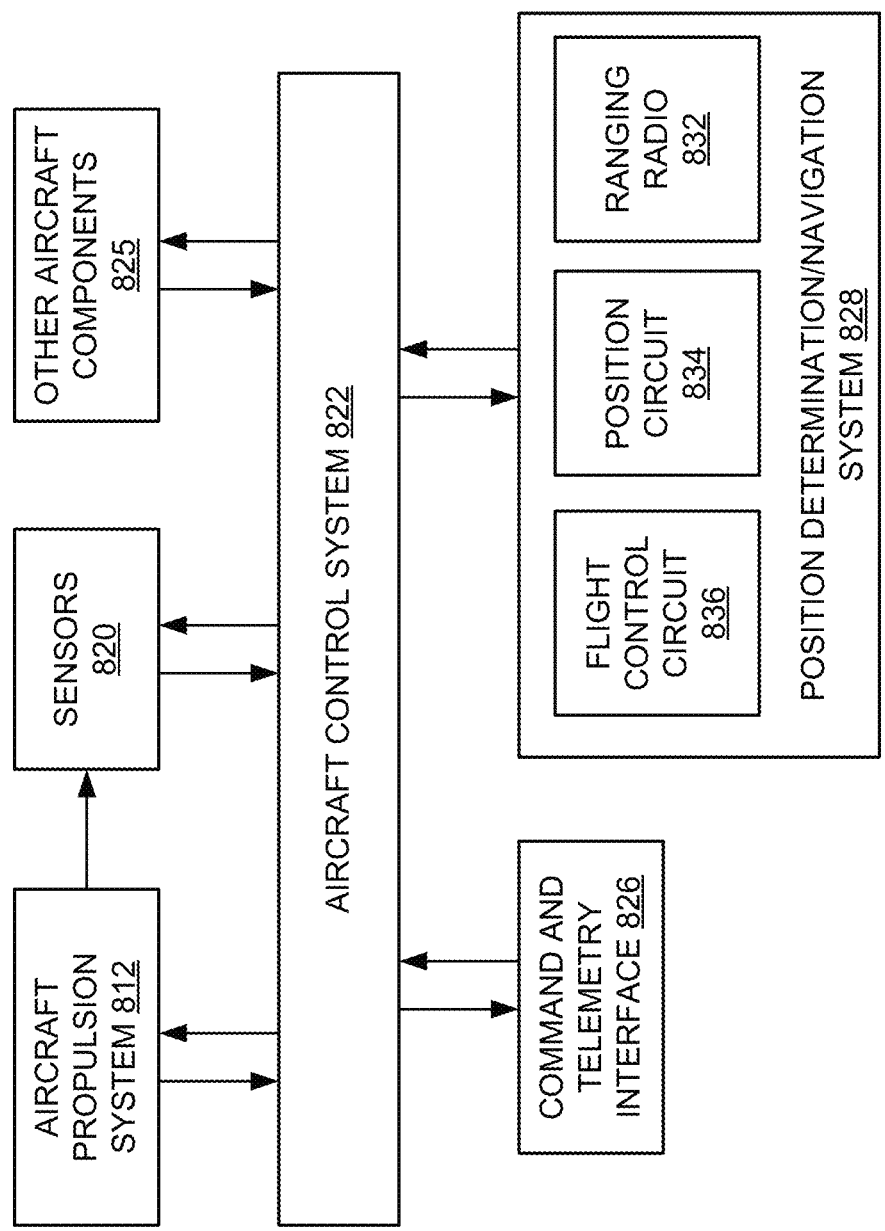
FIG. 8 is a diagram illustrating example UAV components/circuits in accordance with one embodiment of the systems and methods disclosed herein.

FIG. 8 is a diagram illustrating example UAV components/circuits in accordance with one embodiment of the systems and methods disclosed herein. The example UAV in FIG. 8 includes an aircraft propulsion system 212, a forward propulsion system 816, various sensors 820, and onboard aircraft control system 822, and a command/telemetry interface 824.

VTOL propulsion system 812 includes systems and components used for vertical takeoff and landing. This can include, for example, one or more rotors, corresponding engines or motors, and other systems associated with aircraft propulsion. For example, in the case of a hybrid UAV, separate horizontal and vertical propulsion systems can be provided wherein the rotor or rotors of the vertical propulsion system are oriented horizontally or in an approximately horizontal configuration and the rotor or rotors of the horizontal propulsion system are oriented vertically. The rotor or rotors of aircraft propulsion system 812 can be mounted in a fixed orientation, or can be movably mounted such that their orientation can be adjusted. The aircraft propulsion system 812 can include one or more inputs to receive data, commands, control information, or other information to operate or maintain the propulsion systems or components thereof. For example, a throttle control input can be provided to adjust the throttle setting for the propulsion system. Aircraft propulsion system 812 can also include one or more outputs to send data and other information about the propulsion system to other instrumentalities such as, for example, onboard aircraft control system 822 or one or more sensors 820.

One or more sensors 820 can be included with the UAV to sense operating parameters of the aircraft, including parameters of its various systems and subsystems. For example, sensors 820 can include sensors such as temperature sensors, engine RPM sensors, airspeed sensors, altimeters, vibration sensors, and so on. Sensors can accordingly sense conditions or other operating parameters of the UAV (e.g., UAV 101), including its various systems and subsystems. Although illustrated as a single block in this diagram, sensors 220 can include individual discrete sensors disposed in various positions about the aircraft to sense the desired or chosen parameters.

Other aircraft components 825 can also be included with the aircraft to perform other aircraft functions. For example, other aircraft components 825 can include things such as payload control systems (e.g. four package pickup and drop-off), position determination systems (e.g. GPS or other position determination systems), or other components that might be used by the aircraft depending on the aircraft mission.

Command/telemetry interface 826 can be included and provides a communication interface to allow, for example, a ground control system (not illustrated) to communicate with the UAV with one-way or two-way communications. Accordingly, command/telemetry interface 224 can include an antenna (not illustrated) and a wireless transceiver for communications with the ground control system.

Aircraft control system 822 is included to control various functions of the aircraft. Onboard aircraft control system 222 can also be implemented, for example, to receive commands from the ground terminal and interpret those commands to control the propulsion system or other aircraft system, to receive information from other aircraft components such as, for example, sensor data, and to provide that information to command/telemetry interface 224 for transmission to remote control system 202.

In this example, a position determination and aircraft navigation system 828 is included and can be used to determine aircraft position based on signals from the positioning radios at a landing pad, determining flight path that would carry the aircraft from its current position to a position centered over a target point on the landing pad, and to instruct the aircraft to travel in accordance with that flight path. In the illustrated example, the position determination and aircraft navigation system 828 includes a ranging radio 832, a positioning circuit 834, and a flight control circuit 836.

One or more ranging radios 832 can be included and tuned to receive and demodulate ranging signals received from one or more positioning radios at the landing pads. Accordingly, ranging radio 828 includes a communications interface designed and implemented to operate in accordance with the communication standards employed by the positioning radios with which ranging radio 828 will communicate. For example, in one embodiment, ranging radio 828 can be designed to operate according to the IEEE 802.15.4a standard for impulse radio ultra-wide-band (IR-UWB) signals, although other industry standards or proprietary protocols can be used.

Positioning circuit 834 can be included to compute the aircraft's current relative position based on real-time information included in the ranging signals received by ranging radio 832. For example, positioning circuit 834 can be designed to perform the multilateration or trilateration, or other positioning computations that are used to determine the aircraft position, relative to the landing pad, based on the ranging signals. The position information can be shared with flight control circuit 836 which is designed to compute a flight path to the target point on the landing pad based on the relative position determined by positioning circuit 834. Flight control circuit 836 can be further configured to cause the aircraft to travel according to the computed flight path. These operations can be repeated and the relative position and flightpath updated as the aircraft continues toward the landing pad.

Although the functional components of aircraft 200 (e.g., aircraft control system 822, command/telemetry interface 824, positioning radio 832, other aircraft components 825) are partitioned in this example in the manner as illustrated the example of FIG. 8, it is noted that this partitioning is done for clarity of description and by way of example only. After reading this description, one of ordinary skill in the art will understand how different architectures or alternative partitioning of the circuits can be used for the aircraft. For example, in some embodiments, either or both the flight control circuit and the positioning circuit can be included as part of the aircraft control system 822. As another example, the functionality of ranging radio 832 can be included in the command and telemetry interface 826 communications circuits. Additionally, components such as processing devices, memory components, communications buses and so on can be shared among two or more of these multiple functional units. Indeed, in some applications, for example, a single microprocessor (whether single-core or multi-core) system can be used to implement the functions of one or more of aircraft control system 822, flight control circuit 836, positioning circuit 834, other aircraft components 825, as well as portions command/telemetry interface 224, sensors 220, and even digital/electronic portions of the various propulsion systems.

Various components and circuits of the systems described herein may be implemented utilizing any form of hardware, software, or a combination thereof. For example, one or more processors, controllers, ASICs, PLAs, PALs, CPLDs, FPGAs, logical components, software routines or other mechanisms, including associated memory, might be used to implement one or more components or circuits in a system. In implementation, the various components in circuits described herein might be implemented as discrete components or the functions and features described can be shared in part or in total among two or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, in various embodiments these features and functionality can be shared among one or more common software and hardware elements, and such description shall not require or imply that separate hardware or software components are used to implement such features or functionality.

As described above a plurality of positioning radios (e.g. positioning radios 122) can be affixed to or integrated with a landing pad (e.g. landing pad 102) to allow a UAV or other aircraft to more precisely locate and descend toward the center of the landing pad. This can be used to allow more precise pickup and drop off of payloads at the landing pad. For example, where a hook, gripping arms magnet or other attachment mechanism is used to releasably attached to and pick up the package, the ability to center the aircraft over the pad can be useful for alignment of the attaching mechanism. Likewise, in other applications, it is advantageous to allow the UAV to land on the center of the pad.

Because a ranging mechanism is provided that allows the aircraft to locate the pad in real-time such as during landing or payload-pick up operations, embodiments of the systems and methods described herein can provide greater flexibility in landing pad implementation and deployment. For example, because the aircraft can determine the precise location of the pad after navigating to within the general vicinity of the pad, the pad itself can be placed for operations with less precision that may otherwise be required. This can allow, for example, a portable pad to be deployed when needed for flight operations and stored at other times. Because the aircraft is able to locate the pad anywhere in that vicinity this allows flexibility in placing the pad. As a further example, consider the case of a user who is expecting delivery of a package from a merchant. Given a portable landing pad with positioning radios, the user can place the portable landing pad in his or her yard, driveway, etc and provide the delivery address to the merchant. The merchant dispatches the UAV carrying the package to the delivery address, but neither the merchant nor the UAV know the precise location of the pad at that address. Accordingly, once at that address, the UAV receives signals from the positioning radios of the landing pad, confirms identification of the landing pad and checks that with the identification for the package to be delivered then begins ranging to the positioning radios. The UAV uses the ranging information to locate the precise position of the pad at the customer's location, and then navigates to the pad to deliver the package. The same operations can be used for package pickup. A pressure transducer can detect when the package has been delivered (or picked up) and the pad can alert the customer and the merchant of the package delivery or pick up event.

Likewise, the positioning radios can be used to allow the aircraft to locate the position of a landing pad on a moving vehicle. As an example, a user can affix a landing pad to the roof, cargo bed, or other surface of a vehicle. In operation, the location of the vehicle is provided to the aircraft so that the aircraft can navigate to the vehicle location. For example, the vehicle's navigation system can track its position (e.g. by a street address, latitude and longitudinal position, or other position information) and this information can be relayed to the aircraft. The aircraft can fly to the vehicle and when it is within range, lock onto the positioning radios to determine the precise location of the landing pad, and to land on the landing pad. In some embodiments, the UAV can maintain a safe distance above ground as it moves to a position above vehicle, following a course that parallels and tracks the ground movement of the vehicle. Maintaining altitude above a designated minimum altitude while approaching and tracking the vehicle can alleviate issues otherwise associated with obstructions in the flight path such as trees, towers, telephone poles, buildings, and so on. This can be an improvement over embodiments that might utilize a conventional homing device to, for example, direct the aircraft to the vehicle via a line-of-sight path.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A UAV landing system, comprising:
a landing pad defining a landing area for a UAV, the landing area comprising a target point for UAV landing or payload delivery;
a plurality of positioning radios positioned in a spaced apart relation and substantially equidistant from the target point, each positioning radio of the plurality of positioning radios including a radio transmitter wherein each radio transmitter is configured to transmit a ranging signal to an approaching UAV; and
a position determination and aircraft navigation system at the incoming UAV, the position determination and aircraft navigation system comprising:
a radio receiver to receive the ranging signals;
the positioning circuit, communicatively coupled to the radio receiver, that determines a range to each positioning radio using the received ranging signals, and computes a position of the UAV relative to the target point on the landing pad; and
a flight control system that determines a course for the UAV to a point centered above the target point of the landing pad at a predetermined altitude, flies the UAV to the point centered above the target point of the landing pad while maintaining the predetermined altitude, causes the UAV to descend vertically toward the target point when the UAV reaches the point centered above the target point of the landing pad at the predetermined altitude, and remains centered above the target point during vertical descent.

2. The UAV landing system of claim 1, wherein the ranging signals comprise timing information and the positioning circuit determines the range to each positioning radio using a time of flight of each respective ranging signal determined by the timing information.

3. The UAV landing system of claim 1, wherein the positioning circuit computes the position of the UAV relative to the target point of the landing pad as a range and altitude relative to the landing pad.

4. The UAV landing system of claim 1, wherein at least one of the positioning radios further transmits identification information identifying the landing pad.

5. The UAV landing system of claim 1, wherein the target point is the center of the landing pad.

6. The UAV landing system of claim 1, wherein the landing pad is rectangular in geometry, the target point is the center of the landing pad, and the plurality of positioning radios comprises four positioning radios, one disposed at each corner of the landing pad.

7. The UAV landing system of claim 1, wherein the landing pad is round in geometry, the target point is the center of the landing pad, and the plurality of positioning radios comprises four positioning radios disposed at 90-degree intervals around the target point.

8. The UAV landing system of claim 1, wherein the target point is the center of the landing pad, and the plurality of positioning radios comprises positioning radios disposed at each corner of the landing pad.

9. The UAV landing system of claim 1, wherein the flight control system further determines when the UAV is directly above the target point.

10. The UAV landing system of claim 1, wherein the landing pad is a portable landing pad that comprises flexible or foldable material.

11. The UAV landing system of claim 1, wherein the landing pad further comprises a pressure transducer that determines whether a payload is on the landing pad.

12. The UAV landing system of claim 1, wherein the landing pad further comprises a pressure transducer that determines whether a payload is on the landing pad and a communications interface to communicatively couple the landing pad to a user, wherein when a payload is delivered and deposited on the landing pad by the UAV, the pressure transducer detects the presence of the payload and the communications interface sends a message to the user indicating that the payload has been delivered.

13. The UAV landing system of claim 1, wherein the landing pad further comprises an identification circuit that identifies the payload delivered and provides the identification to the communications interface.

14. A UAV landing pad, comprising:
a landing pad comprising a landing area for a UAV, the landing area comprising a target point for UAV landing or payload operations;
a plurality of positioning radios positioned in a spaced apart relation and substantially equidistant from the target point, each positioning radio of the plurality of positioning radios including a radio transmitter to transmit a ranging signal to a position determination and aircraft navigation system of an approaching UAV, wherein the UAV receives the ranging signals;
determines a range to each positioning radio using the received ranging signals, computes a position of the UAV relative to the target point of the landing pad, determines a course for the UAV to a point centered above the target point of the landing pad at a predetermined altitude, flies the UAV to the point centered above the target point of the landing pad at the predetermined altitude, descends vertically toward the target point when the UAV reaches the point centered above the target point of the landing pad at the predetermined altitude, and remains centered above the target point during vertical descent.

15. The UAV landing pad of claim 14, wherein the ranging signals comprise timing information and the positioning circuit determines the range to each positioning radio using a time of flight of each respective ranging signal determined by the timing information.

16. The UAV landing pad of claim 14, wherein at least one of the positioning radios further transmits identification information identifying the landing pad.

17. The UAV landing pad of claim 14, wherein the target point is the center of the landing pad.

18. The UAV landing pad of claim 14, wherein the landing pad is rectangular in geometry, the target point is the center of the landing pad, and the plurality of positioning radios comprises four positioning radios, one disposed at each corner of the landing pad.

19. The UAV landing pad of claim 14, wherein the landing pad is a portable landing pad that comprises flexible or foldable material.

20. The UAV landing pad of claim 14, wherein the landing pad further comprises a pressure transducer that determines whether a payload is on the landing pad.

21. The UAV landing pad of claim 14, wherein the landing pad further comprises a pressure transducer that determines whether a payload is on the landing pad and a communications interface to communicatively couple the landing pad to a user, wherein when a payload is delivered and deposited on the landing pad by the UAV, the pressure transducer detects the presence of the payload and the communications interface sends a message to the user indicating that the payload has been delivered.

22. The UAV landing pad of claim 14, wherein the landing pad further comprises an identification circuit that identifies the payload delivered and provides the identification to the communications interface.

23. A method for computing a landing solution for a UAV, comprising:
transmitting a plurality of ranging signals each ranging signal being transmitted from one of a plurality of positioning radios positioned in a spaced apart relation and substantially equidistant from a target point on a landing pad defining a landing area for the UAV;
a radio receiver at the UAV receiving the ranging signals from the plurality of positioning radios;
a positioning circuit at the UAV, determining a range to each positioning radio using the received ranging signals, the positioning circuit at the UAV computing a position of the UAV relative to the target point of the landing pad; and
a flight control system at the UAV determining a course for the UAV to a point centered above the target point of the landing pad at a predetermined altitude using the computed relative position of the UAV;
the flight control system at the UAV causing the UAV to fly to the point centered above the target point of the landing pad at the predetermined altitude, causing the UAV to descend vertically toward the target point when the UAV reaches the point centered above the target point of the landing pad at the predetermined altitude, and remaining centered above the target point during vertical descent.

* * * * *